Jan. 27, 1970 C. E. GRYCTKO ET AL 3,492,539
MOUNTING ARRANGEMENT FOR AN ELECTRICAL SWITCHING DEVICE
Filed Aug. 21, 1968 10 Sheets-Sheet 1
FIG. 1
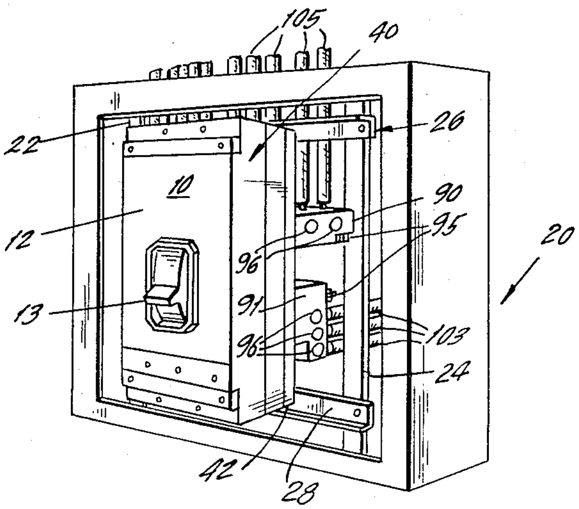
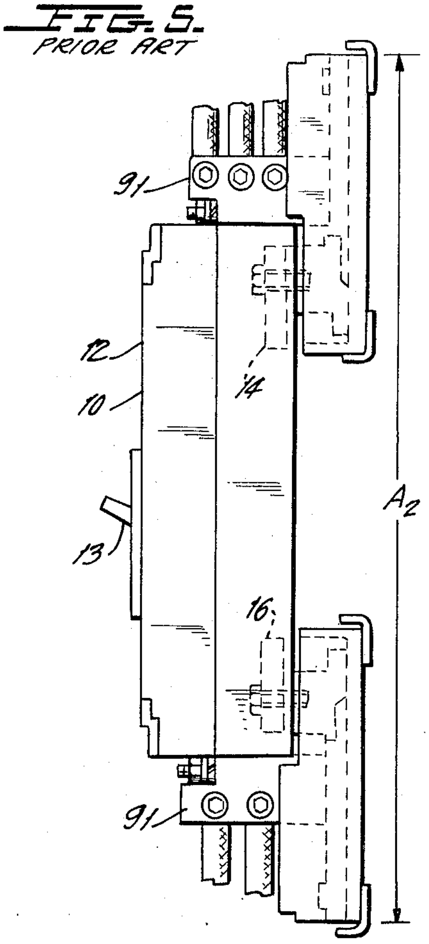
FIG. 4
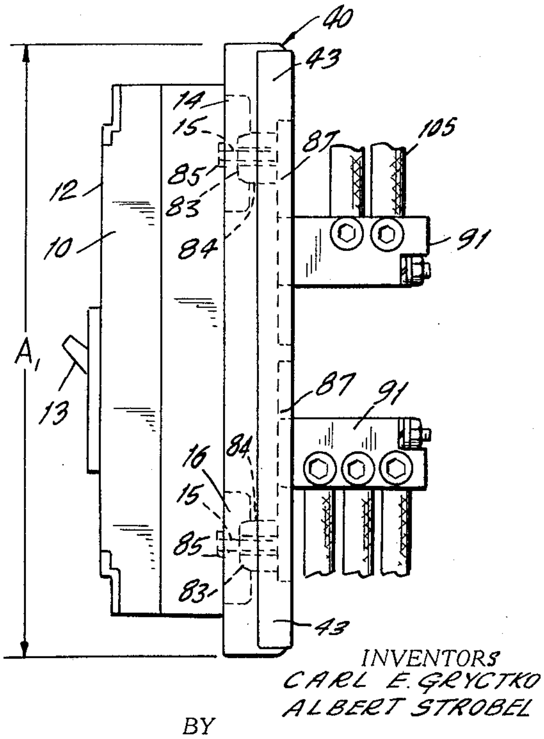
INVENTORS
CARL E. GRYCTKO
ALBERT STROBEL
BY
OSTROLENK, FABER, GERB & SOFFEN
ATTORNEYS Jan. 27, 1970 C. E. GRYCTKO ET AL 3,492,539

MOUNTING ARRANGEMENT FOR AN ELECTRICAL SWITCHING DEVICE

Filed Aug. 21, 1968 10 Sheets-Sheet 2

Jan. 27, 1970 C. E. GRYCTKO ET AL 3,492,539

MOUNTING ARRANGEMENT FOR AN ELECTRICAL SWITCHING DEVICE

Filed Aug. 21, 1968 10 Sheets-Sheet 4

INVENTORS
CARL E. GRYCTKO
ALBERT STROBEL
BY
OSTROLENK, FABER, GERB & SOFFEN
ATTORNEYS

INVENTORS
CARL E. GRYCTKO
ALBERT STROBEL
BY
OSTROLENK, FABER, GERB & SOFFEN
ATTORNEYS

MOUNTING ARRANGEMENT FOR AN ELECTRICAL SWITCHING DEVICE

Filed Aug. 21, 1968 10 Sheets-Sheet 6

Jan. 27, 1970 C. E. GRYCTKO ET AL 3,492,539

MOUNTING ARRANGEMENT FOR AN ELECTRICAL SWITCHING DEVICE

Filed Aug. 21, 1968 10 Sheets-Sheet 7

United States Patent Office 3,492,539

Patented Jan. 27, 1970

3,492,539

MOUNTING ARRANGEMENT FOR AN ELECTRICAL SWITCHING DEVICE

Carl E. Gryctko, Haddon Heights, and Albert Strobel, Cherry Hill, N.J., assignors to I-T-E Imperial Corporation, Philadelphia, Pa., a corporation of Delaware Filed Aug. 21, 1968, Ser. No. 754,278
Int. Cl. H02b 1/02, 11/00
U.S. Cl. 317—119 7 Claims

ABSTRACT OF THE DISCLOSURE

This invention comprises a mounting arrangement for an electrical switching device, such as a multi-pole circuit breaker, which utilizes an intermediate support structure having separate conducting means for electrically and mechanically bolt connecting the terminals of the switching device to the external circuitry, and which is orientated to avoid an appreciable increase of longitudinal length.

Our invention relates to an improved compact mounting arrangement for conveniently securing an electrical switching device to a support structure, and providing independent means for bolt connecting the terminals thereof to an external circuit. More particularly, the present structure is an improvement over similar types of mounting arrangements, as shown in U.S. Patent Nos. 3,366,844 and 3,366,846.

As shown in the above-noted patents, installation of electrical switching devices, as for example circuit breakers of the multi-phase variety, is conventionally made to a support structure which rigidly mounts the circuit breaker and provides access for reception of the line and load connections thereof. Such circuit breaker units generally include line and load terminals at their opposed housing ends, which when mounted to the support structure will be located at opposite ends thereof. These terminals must, in turn, be connected to the external circuitry, typically by cables or bus connectors. In the larger frame size breakers, as for example, of the type shown and discussed in U.S. Patent No. 3,268,702, the weight of the breaker is quite substantial, e.g. 50 pounds. Hence, a firm, rigid and mechanically secure mounting arrangement is required. Also, for such larger frame size of breakers, it is the general practice to employ bolt type terminal connections for their lower resistance.

Above-noted U.S. Patent No. 3,366,846 shows an extremely practical concept, in that the bolted connections to the external circuit are made to a base support mounting member, independent of the bolted connection to the circuit breaker terminals. Thus, the circuit breaker may be removed from the mounting means without disturbing the external circuitry connections, with the mounting of the circuit breaker providing the requisite secure mechanical and electrical engagement. Also, above-noted U.S. Patent 3,366,844 shows the provision of an auxiliary intermediary connector, to provide extreme versatility in the cable routing to the circuit breaker enclosure.

The mounting arrangements shown in the above-noted patents disadvantageously necessitates a substantial longitudinal increase over the dimensions of the circuit breaker housing. That is, the individual base support members extended longitudinally beyond the circuit breaker housing, with the connections to the external circuitry being made at such longitudinal extremities. This longitudinal positioning of the mounting means had, in part, been required, in order to prevent dielectric breakdown between the line and load end conductors.

In accordance with our invention, the circuit breaker mounting member has been constructed such that it may be positioned longitudinally coextensive with the circuit breaker while providing the requisite electrical isolation. Instead of having the electrical connecting means of the mounting block assembly extend longitudinally beyond the circuit breaker housing, we extend the electrical connecting means towards the longitudinal central housing portion, and adjacent the rear surface of the circuit breaker housing. The electrical connections to the external circuitry are made rearward of the circuit breaker housing at these longitudinally central regions of the electrical connecting means.

The individual electrical connecting means of the mounting member includes a first portion which is bolted to the circuit breaker terminals, and a second portion which is bolted to the external circuitry. The external circuitry connections may typically be in the form of bus bars directly bolted thereto. Alternatively, where cables are utilized, an intermediary connecting member is employed, which is bolt connected to the above-noted second portions. This intermediary connecting member includes a plurality of apertures, which receive the external cabling and pressure screws for firmly connecting the cabling thereto. In accordance with a particularly advantageous aspect of the latter mounting arrangement, one form of the intermediary connecting member is designed for orientation, such that the axis of the cable receiving aperture means is perpendicular to the longitudinal direction. This permits the external cabling approaching the support structure from the rear to be directly routed to the intermediary member, along substantially straight line paths along such perpendicular direction, and avoids a cumulative effect of current in the path from the external cabling to the circuit breaker terminals. When desired, another form of the intermediary connecting means may be used, such that the cable runs are in straight line paths to the upper or lower regions of the support structure.

It is therefore seen that our invention provides an improved compact mounting arrangement for utilization in conjunction with an electrical switching device, such as a circuit breaker, which provides the advantages heretofore obtainable only in mounting arrangements requiring a longitudinally elongated enclosure.

It is therefore a basic object of our invention to provide an improved mounting arrangement for an electrical circuit breaker device.

A further object of our invention is to provide a compact mounting arrangement for a circuit breaker device, wherein bolt connections to the external circuitry and the circuit breaker terminals are separately provided for.

Another object of our invention is to provide an improved mounting arrangement for a multi-phase circuit breaker device, which includes separate mounting members extending from the longitudinal ends of the circuit breaker, towards the longitudinally central housing portion.

An additional object of our invention is to provide an improved circuit breaker mounting arrangement, including individual phase conductors mounted to separate line and load mounting members, which extend centrally of the circuit breaker housing, supported within insulative means which includes sufficient insulating material for electrically insulating the transversely adjacent individual phase conductors of the same mounting member, and the longitudinally proximate individual phase conductors of the line and load mounting members.

These as well as other objects of our invention will become readily apparent upon consideration of the following description and drawings, in which:

FIG. 1 is a perspective view, showing a typical manner in which the compact mounting arrangement of our invention may be utilized to mount a multi-pole circuit breaker device in conjunction with external cabling.

FIG. 4 is a longitudinal side view showing the manner in which the circuit breaker is mounted to the support structure, with the external circuit connections being shown entering from the longitudinal ends of the enclosure.

FIG. 5 corresponds to FIG. 4, but shows the prior art arrangement, which had required an appreciably longer support structure.

Figures 6, 10:
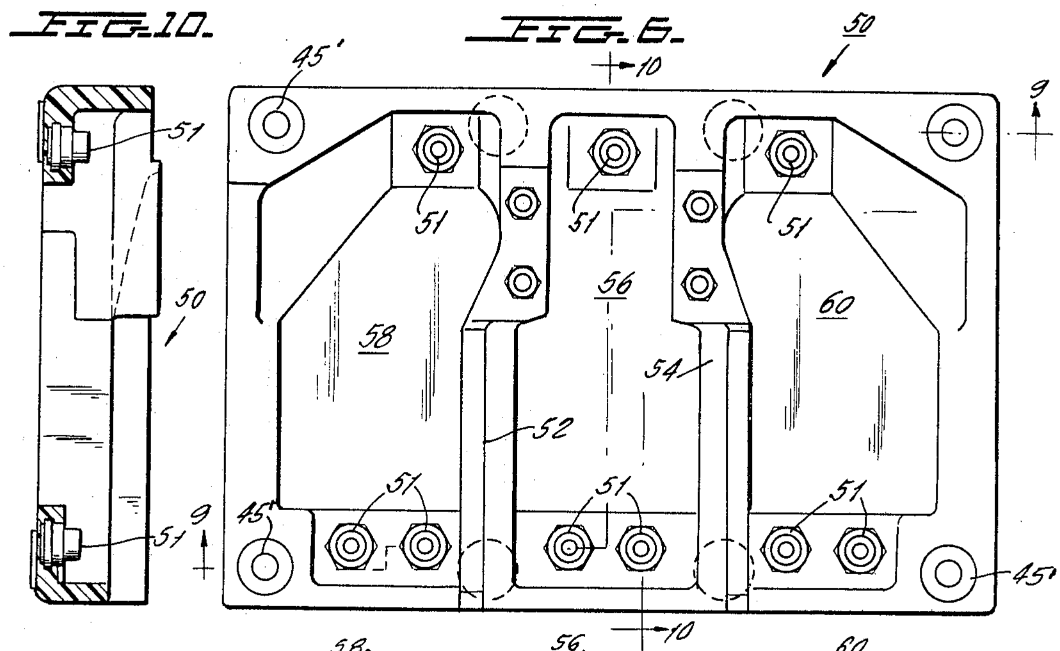
Figure 7:
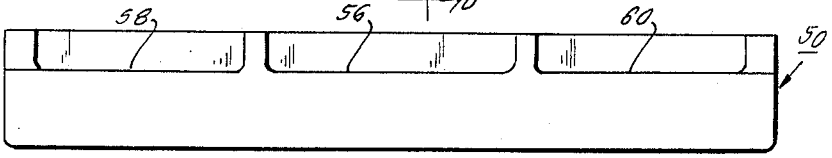
Figure 8:
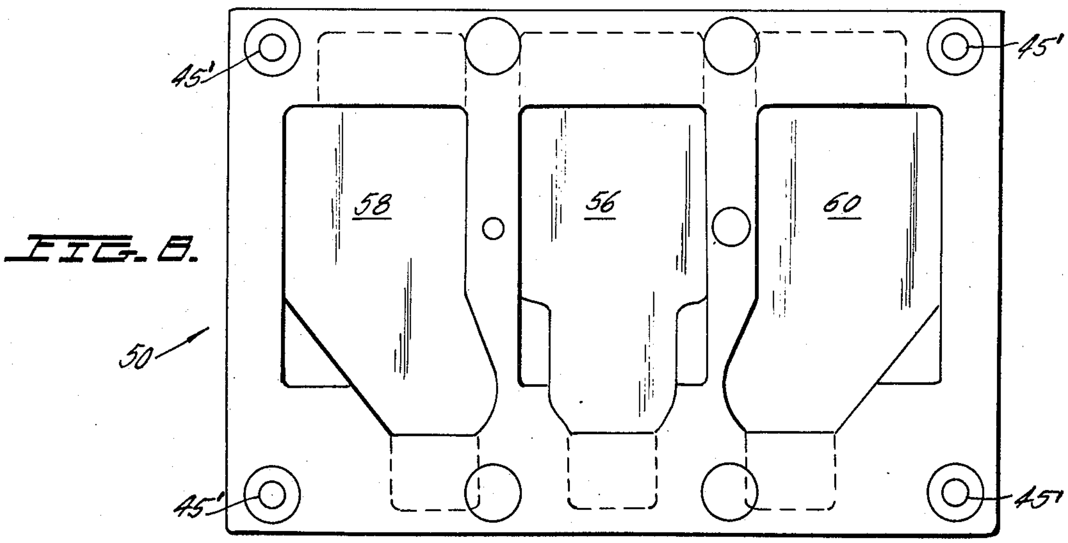
Figure 9:
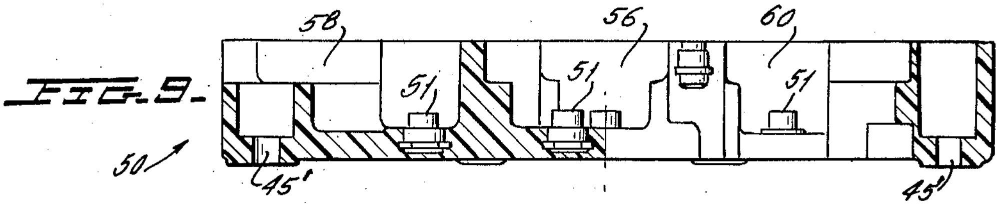

FIGS. 6–10 show details of the insulative mounting means of each mounting member. FIG. 6 is a top view, FIG. 7 is an end view, FIG. 8 is a bottom view, FIG. 9 is a cross-sectional view along the sectioning line 9—9 of FIG. 6, and FIG. 10 is a cross-sectional view along the sectional line 10—10 of FIG. 6.

Figure 12:
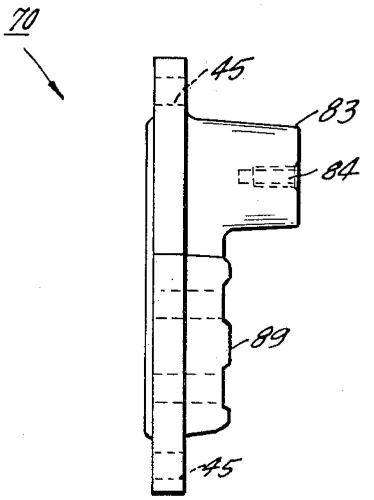
Figure 11:
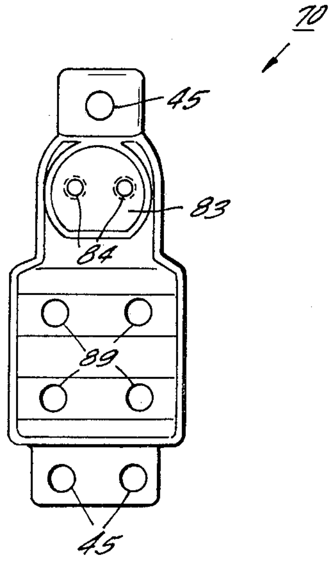

FIGS. 11 and 12 are top and end views respectively of the electrical connecting means for the center phase.

Figure 15:
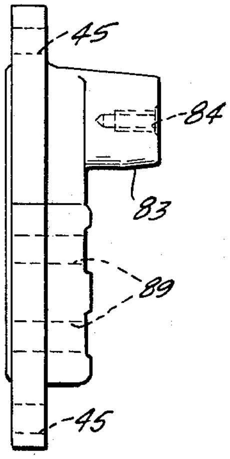
Figure 14:
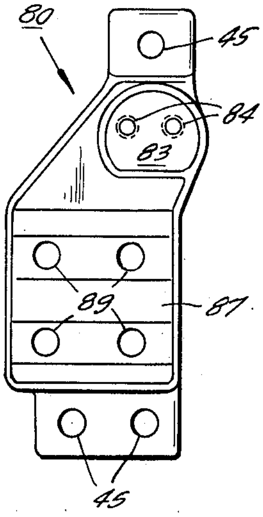
Figure 13:
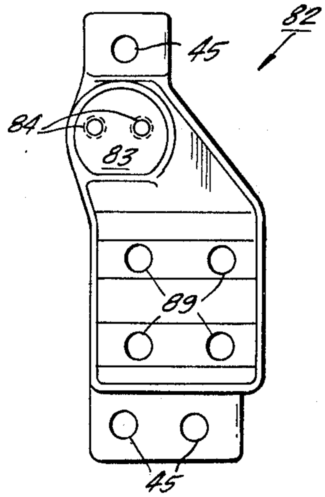

FIGS. 13 and 14 are top views of the electrical connecting means for the outer two phases, and FIG. 15 is an end view corresponding to either of these connecting means.

Figure 16:
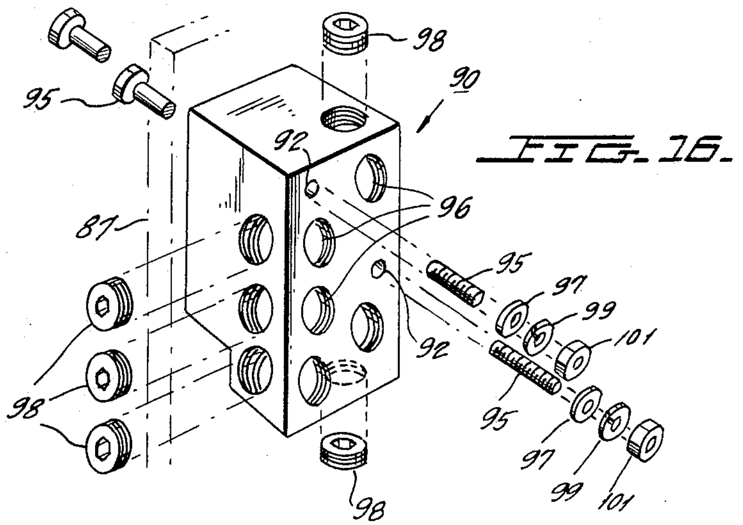

FIG. 16 is an exploded view of a form of intermediary cable connecting means which may be advantageously used in conjunction with the instant mounting arrangement.

Figure 17:
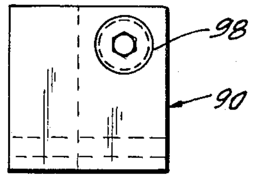
Figure 19:
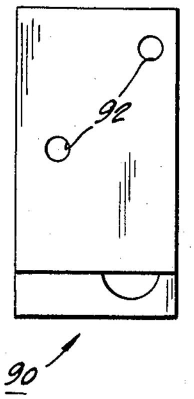
Figure 18:
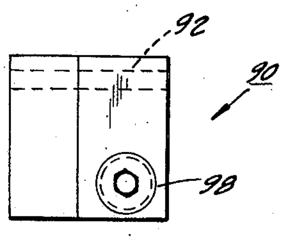

FIGS. 17 and 18 are top and bottom views of the intermediary connecting means shown in FIG. 16.

Figure 20:
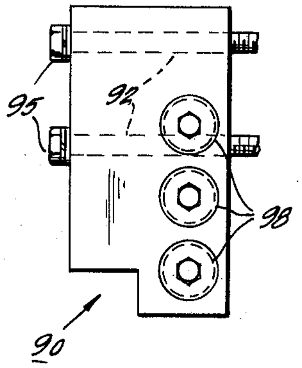
Figure 19A:
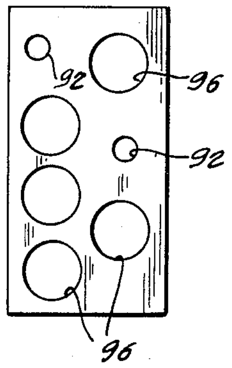
Figure 20A:
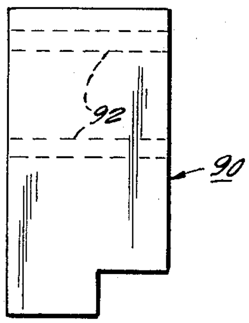

FIGS. 19, 20, 19A and 20A are side views from all four surfaces, with FIG. 20 showing the addition of the mounting bolts.

FIGS. 21–40 show in simplified form typical bus and cable connections that may be made to the mounting means of the instant invention.

Figures 21, 22, 23, 24:
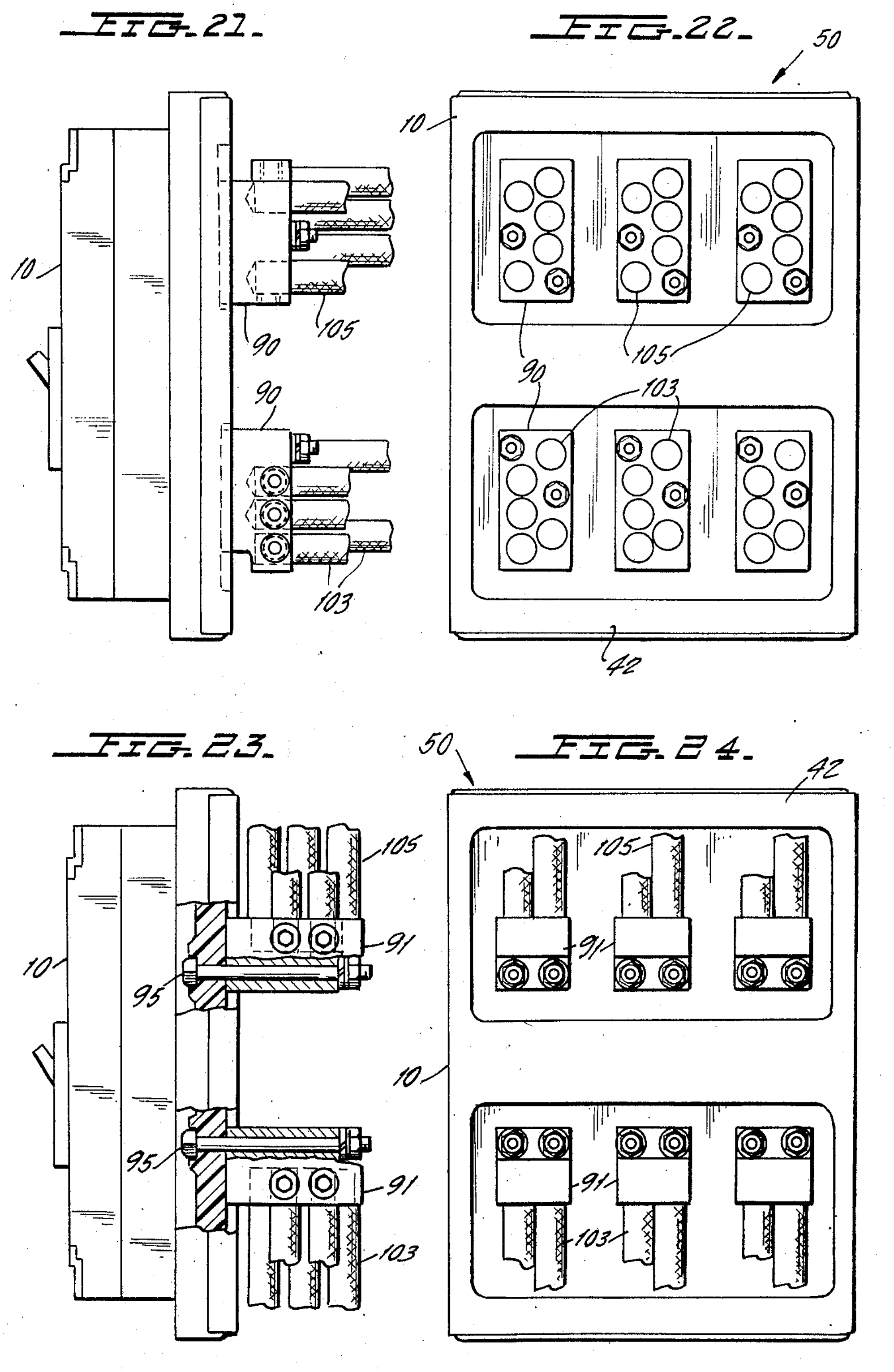

FIGS. 21 and 22 show the utilization of an intermediary cable connecting means, orientated to permit straight line cable runs from the rear of the enclosure.

FIGS. 23 and 24 show intermediary cable connecting means, oriented to permit cable runs from the upper and lower extremities of the support enclosure.

Figure 25:
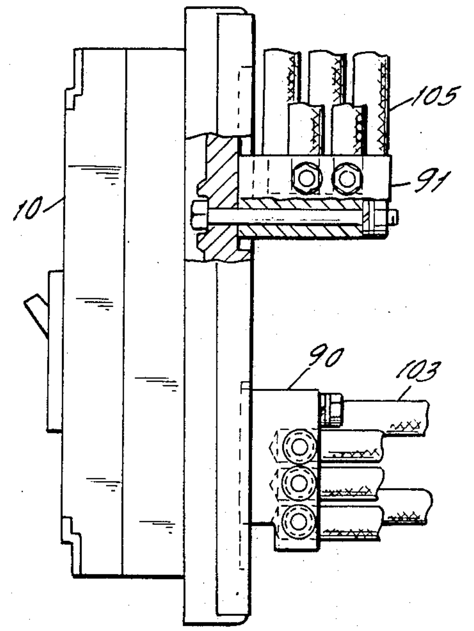
Figure 26:
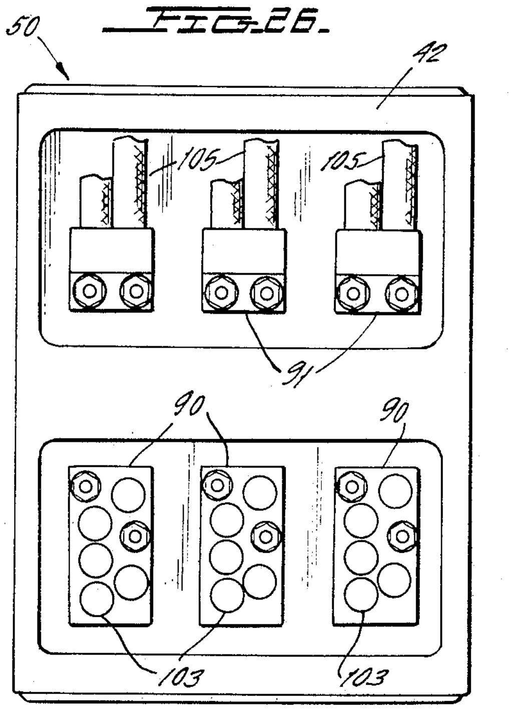

FIGS. 25 and 26 show the intermediary cable connecting means oriented for the entry of cable runs from the rear at the lower terminals, and from above the mounting support for the lower terminals, as previously illustrated in FIG. 1.

Figure 27:
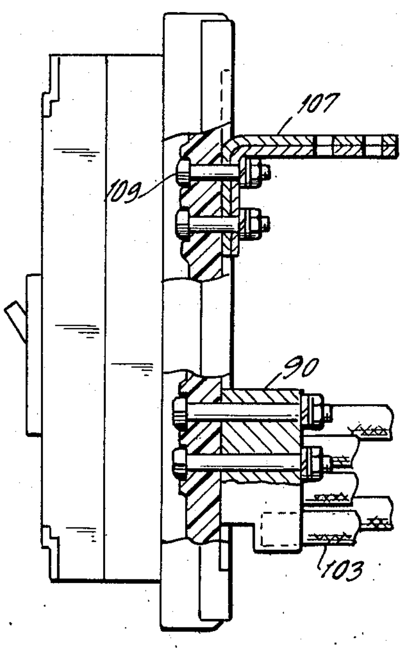
Figure 28:
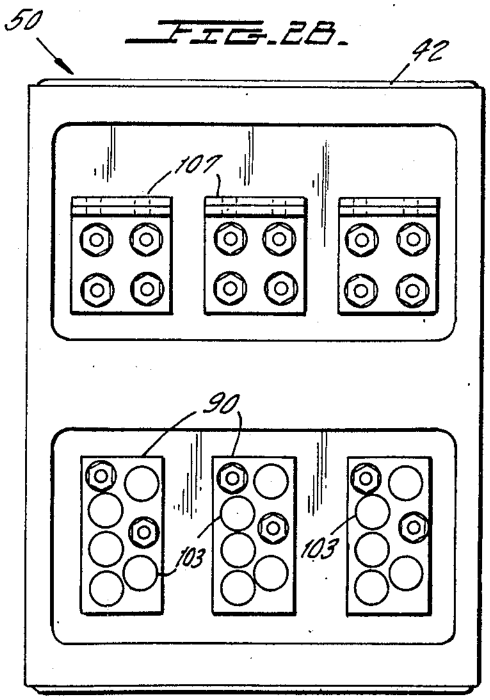

FIGS. 27 and 28 show the lower circuit breaker terminals, connected to cables entering from the rear in the manner of FIGS. 21 and 22, while the upper terminals are connected to bus runs entering from the rear.

Figures 29, 30:
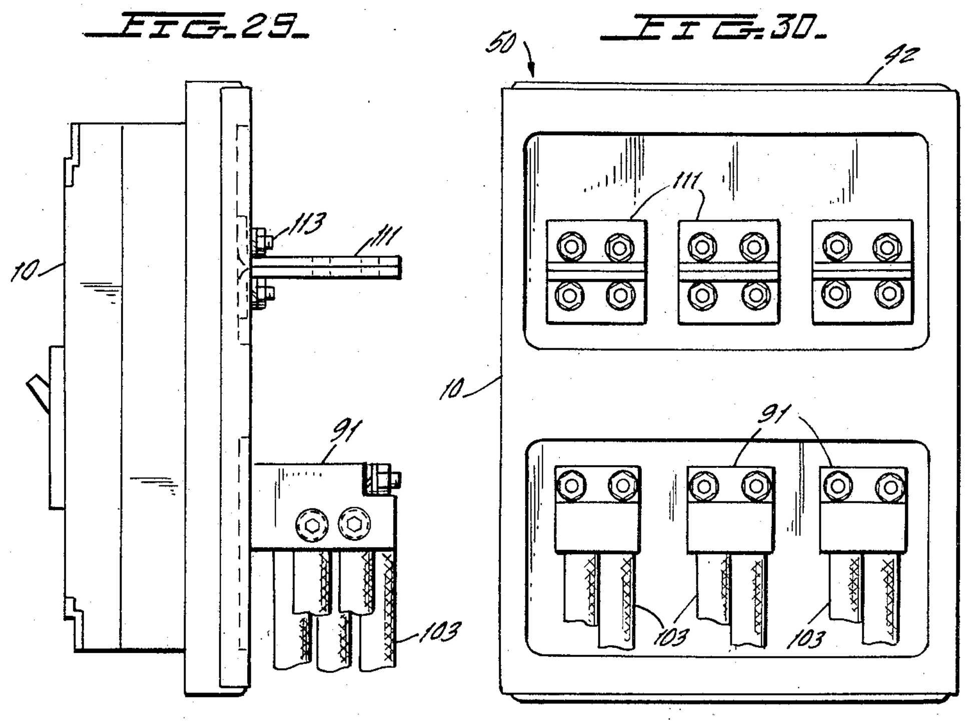

FIGS. 29 and 30 show the lower circuit breaker terminals connected to cables via intermediary connectors, as shown in FIGS. 23 and 24, while the upper terminals are connected to bus runs entering from the rear, but of a configuration differing from that shown in FIGS. 27 and 28.

Figures 31, 32:
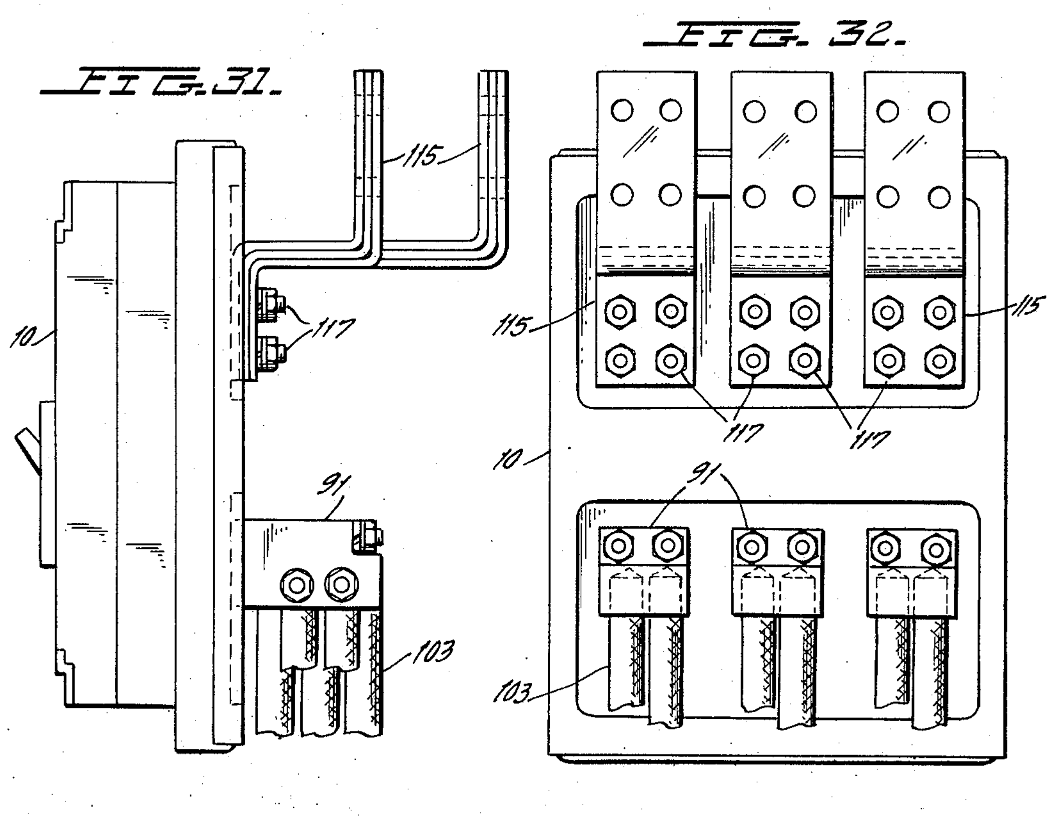

FIGS. 31 and 32 show the lower circuit breaker terminals connected as shown in FIGS. 23 and 24, while the upper terminals are bolted to bus runs adapted to enter through the upper portion of the enclosure.

Figure 34:
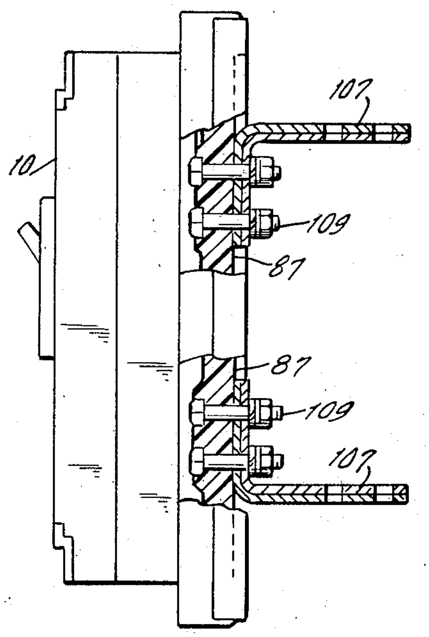
Figure 33:
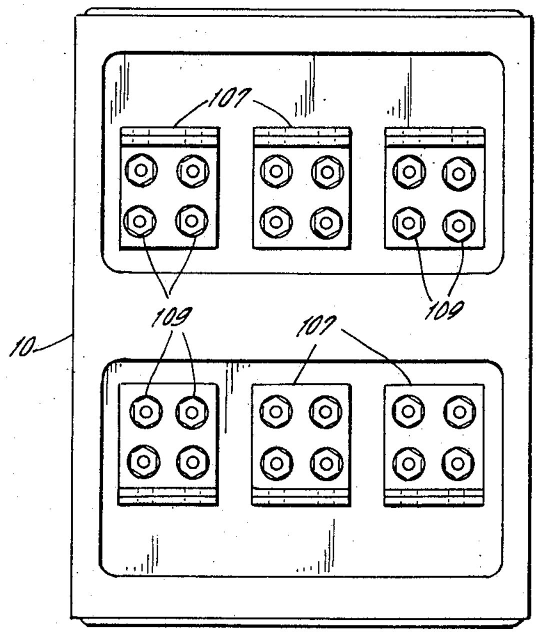

FIGS. 33 and 34 show both the upper and lower terminals being connected to bus runs entering from the rear.

Figure 36:
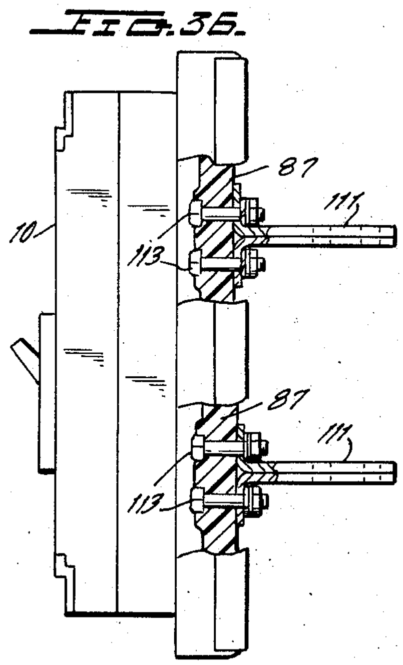
Figure 35:
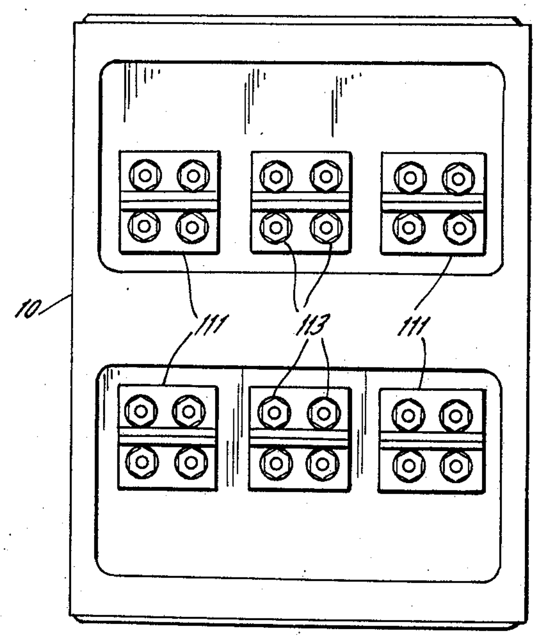

FIGS. 35 and 36 show both the upper and lower terminals being connected to bus runs entering from the rear, but of the alternative configuration.

Figures 37, 38, 39, 40:
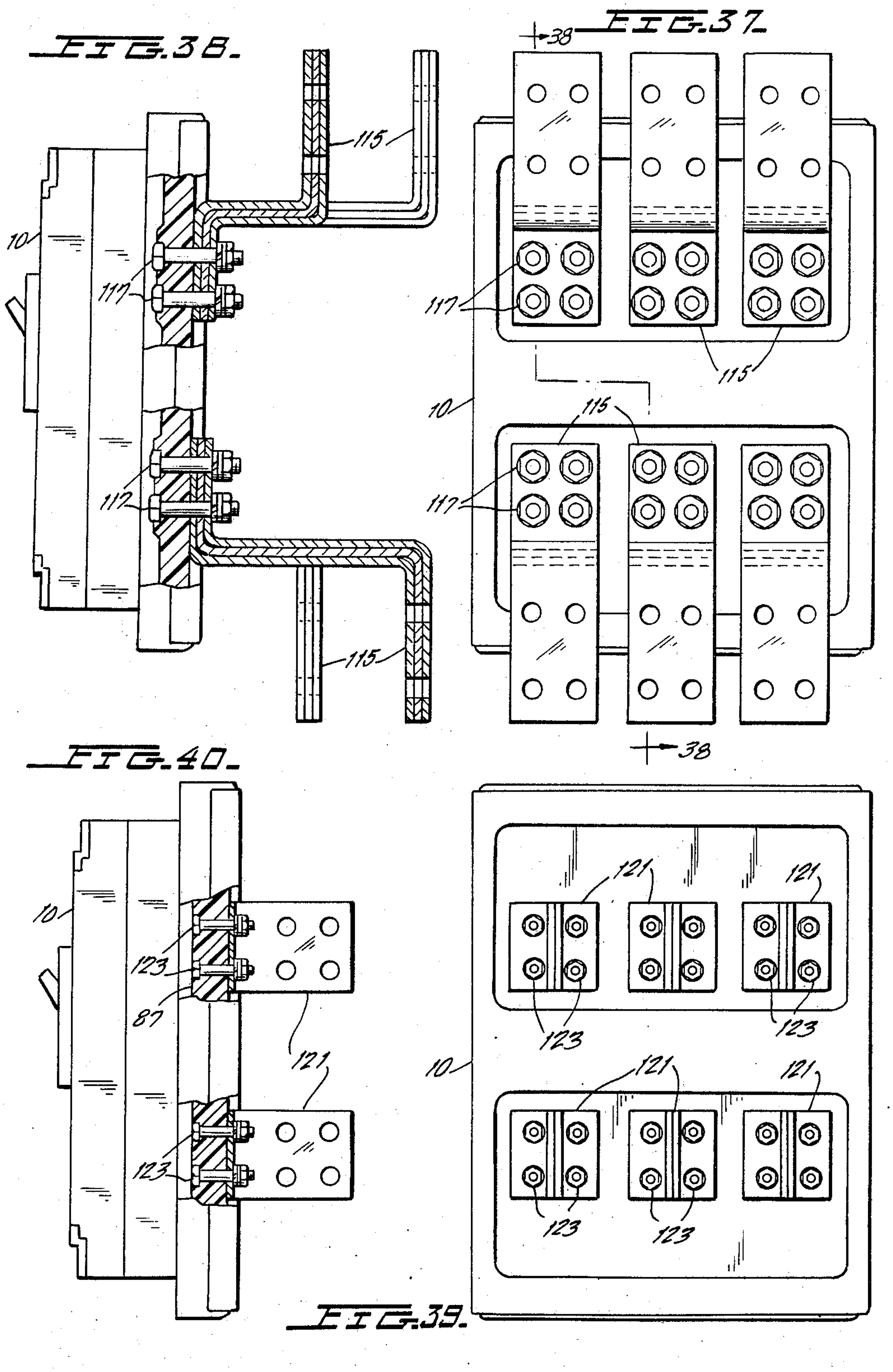

FIGS. 37 and 38 show both the upper and lower terminals being connected to bus runs entering from the top and bottom of the mounting enclosure.

FIGS. 39 and 40 show the securement of another form of intermediary bus connector to the upper and lower terminals.

Referring initially to FIGS. 1–5, circuit breaker unit 10, which is shown supported and connected to the external circuitry by the support structure of our invention is illustratively a three-pole unit of the type shown in U.S. Patent No. 3,268,702. It should, however, be recognized that this particular circuit breaker unit is shown only for illustrative purposes, and the mounting arrangement of the instant invention may be utilized in conjunction with numerous other electrical switching devices. This mounting concept has, however, demonstrated particularly advantageous results where the electrical device is intended to conduct substantial currents, and is of an appreciable weight. As, for example, the circuit breaker unit 10 may typically be designed to have a continuous current rating in excess of 1600 amperes, and an interrupting rating of 75,000 amperes at 600 volts. These ratings require substantial and rugged current carrying members and operating components, with the electrical circuit connections being made by virtue of tightly secured bolt connections to minimize the voltage drops and attendant heating.

Circuit breaker unit 10 is enclosed within a two-part housing 12, having a manual operating handle 13 extending outwardly from the cover portion. As is well known, such a three-phase circuit breaker includes separate current paths for each of the phases, terminated by line terminals 14 at one end and load terminals 16 at the opposite longitudinal end. In connecting the individual line and load terminals to the external circuitry, it is necessary that appropriate insulation be provided between the adjacent phases at either end, as well as for preventing breakdown between the line and load ends. This is provided for in accordance with the instant invention by virtue of the insulation of the circuit breaker housing enclosure 12 as well as the insulation of the mounting members to be hereinafter described.

Figure 2:
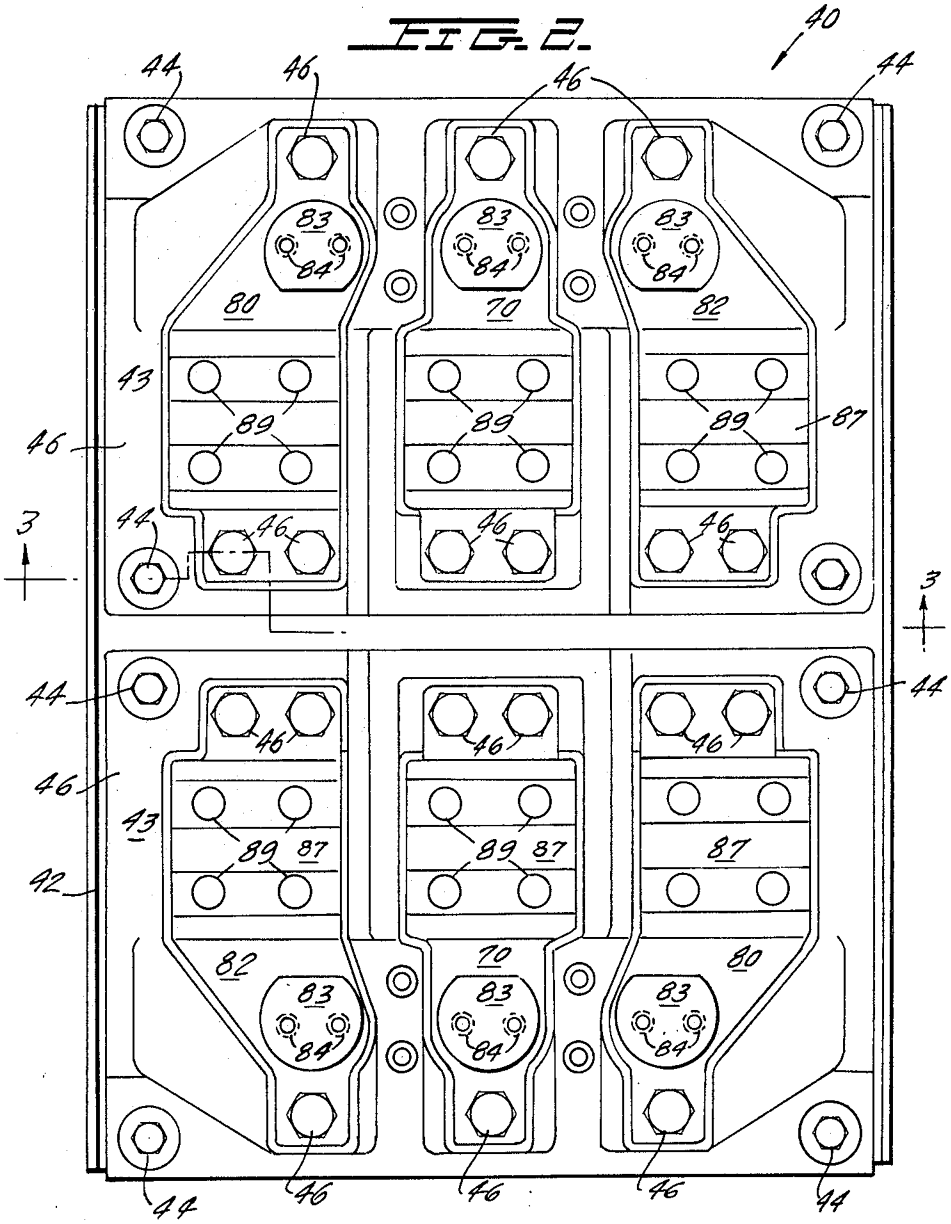
FIG. 2 is a plan view of the support structure mounting assembly, prior to the reception of the circuit breaker or external circuitry.
Figure 3:
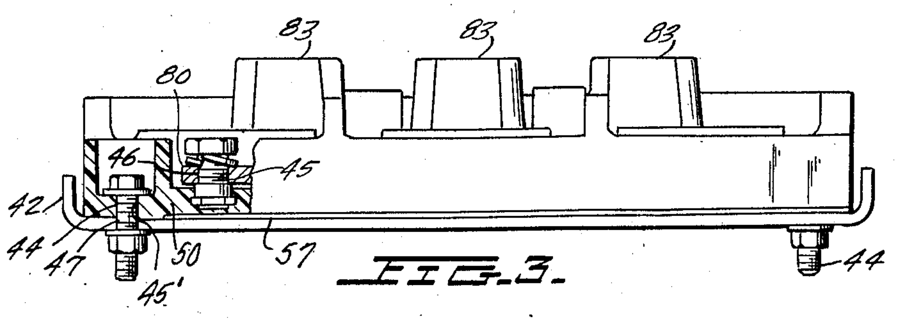
FIG. 3 is a cross-sectional view along the line 3—3 of FIG. 2.

Circuit breaker 10 is of an appreciable weight and must be rigidly supported by the mounting means, which also serves to provide electrical connections to the external circuitry. The overall mounting assembly is shown located within an enclosure 20, having vertical supports 24 and laterally extending transverse support members 26, 28. The support members are located to receive the mounting support assembly 40, as shown in FIGS. 2 and 3.

Mounting support assembly 40 is located on a mounting pan 42, to which a pair om mounting member assemblies 43 are bolted by bolt means 44. Each of the line and load ends of mounting member assemblies 43 are of identical construction and includes an insulative means 50, the details of which are shown in FIGS. 6–10. Insulative means 50 is separated into three compartments by intermediate longitudinal walls 52 and 54. The central compartment 56 is intended to receive the electrical connecting means 70, as shown in FIGS. 11 and 12. End compartment 58 is intended to receive the electrical conductor 80 shown in FIG. 14, and end compartment 60 in intended to receive the electrical conductor 82, as shown in FIG. 13. Electrical connecting means 70, 80 and 82 are bolted within the insulative means 50 by bolt members 46 which pass through apertures 45 of the electrical connecting means and apertures 51 of the insulative support 50. Bolt means 44 extends through aligned apertures 45′, in the insulative means 50, and apertures 47 of the mounting pan 42; and apertures of the enclosure transverse supports.

The electrical connecting means 70, 80 and 82 includes a first portion 83 which, as best shown in FIG. 4, is longitudinally coextensive and rearwardly adjacent the respective line and load terminals 14 and 16 of the circuit breaker 10. These forwardly extending portions 83 have a cross-sectional configuration which conforms to a rear re-entrant opening of the circuit breaker itself, as shown in U.S. Patent No. 3,334,277, and preferably serve as a means for providing a temporary support of the circuit breaker during its initial securement to the mounting assembly. Portion 83 includes tapped apertures 84, which will be in alignment with aperture 15 of the circuit breaker terminals for receiving a connecting bolt 85, which serves to securably electrically and mechanically connect the circuit breaker line and load terminals to the support structure.

In accordance with the instant invention, the mounting members 43 are orientated with respect to the circuit breaker 10, such that they extend towards the longitudinally central housing portion. That is, each of the electrical connecting means 70, 80 and 82 includes a second portion 87, which is longitudinally inward of terminal connecting portion 83, and is rearwardly adjacent the circuit breaker housing, with the circuit breaker forwardly overlying such portion 87. Thus, as best seen in FIG. 4, the support structure including the mounting members has an overall longitudinal extent $A_1$, which substantially corresponds to the longitudinal extent of the circuit breaker housing. This substantial correspondence is contrasted to the prior art arrangement, as shown in FIG. 5, having an appreciably increased longitudinal length $A_2$.

When the circuit breaker 10 is mounted in accordance with our invention, the conductive portions 87 of the line and load end mounting assemblies 43 will be in longitudinal proximity. Accordingly, insulative support means 50 must be dimensioned, and be formed of a material providing the necessary electrical isolation between both the transversely adjacent individual phase conductors and the longitudinally proximate individual line and load conductors. It has been found that the insulative structure, as shown in FIGS. 6–10, provides the requisite dielectric integrity in conjunction with circuit breakers of the type shown in U.S. Patent No. 3,268,702, designed for current ratings in the order of 1600 amperes, at an interrupting rating of 75,000 amperes at 600 volts. It is naturally to be understood, however, that this is merely a particular illustrative embodiment, and is not intended as a limitation of our invention.

The portion 87 of each of the electrical connecting means 70, 80 and 82 is provided with similarly located apertures 89. Apertures 89 are intended to be bolted to the external circuitry, for electrically connecting such circuitry to the circuit breaker terminals, via the insulatively isolated connecting means 70, 80 and 82. Connecting portions 87 are accessible from the rear of the mounting pan 42, and may be connected either to bus runs, or to cable connectors, in the various ways typically shown in FIGS. 21–40.

When the incoming connections are in the form of cables, an intermediary connecting means is preferably employed. One form of intermediary connecting means 90 is shown in FIGS. 16–20A. The intermediary connecting means 90 includes a pair of apertures 92 for receiving bolt means 95. In accordance with the desired orientation of the intermediary connecting means 90, the bolt means 95 pass through apertures 92, and in conjunction with washers 97, lock washer 99 and nut 101, secure the intermediary connecting members 90, such that the cable receiving apertures 96 have their axes perpendicular to the longitudinal direction. This is shown for the lower terminals of FIG. 1, such that the cable runs 103 approaching the support structure from the rear are directly routed to apertures 96, in substantially straight line paths along the direction of the axes of apertures 96. Threaded inserts 98 are then utilized to provide a firm engagement with the conductors of the cables 103. Under this condition, the electrical path through intermediary connecting member 90, will be in a straight line, towards the forward region thereof, thereby minimizing a cumulative current effect.

The utilization of a slightly modified form of the intermediary conducting member 91 may be used for cable runs entering from the top or bottom of the enclosure, as shown for the line terminals of FIG. 1. The details of intermediary connector 91 may be seen by referring to U.S. Patent No. 3,366,844.

Reference is now made successively to FIGS. 21–40, which show the versatility of mounting arrangements, which may be achieved in accordance with our improved compact mounting structure.

FIGS. 21–22 correspond to a condition where both the lower and upper external circuitry connections are provided by cabling 103, 105 respectively, entering from the rear of the mounting support. The intermediary connecting members 90 are orientated as shown, such that both cable runs are along straight line paths, as previously discussed in conjunction with the lower terminals of FIG. 1.

FIGS. 23 and 24 correspond to the condition wherein the external circuitry connections are provided by cabling 103, 105, entering from the lower and upper regions, respectively, of the mounting support. Under this condition, the intermediary connecting members 91 are positioned as shown, corresponding to the upper terminals of previously discussed FIG. 1, so as to accommodate straight line cable runs.

FIGS. 25 and 26 show the condition of FIG. 1, wherein one of the cable runs 103 enters from the rear of the support structure, whereas the other cable run 105 enters from above the support structure.

Referring to FIGS. 27 and 28, the lower terminal connection is made by virtue of cabling 103 entering from the rear, as shown in FIGS. 21 and 22. Hence, the intermediary connecting member 90 is orientated as shown in this figure. The upper terminals are directly connected to bus connector members 107, by virtue of bolts 109, with bus conductors 107 designed to accommodate a bus run entering from the rear.

Reference is now made to FIGS. 29 and 30, which show still another arrangement of the upper bus conductors 111, bolted by member 113 to the connecting member. Bus conductors 111 are of a well known type, differing from that shown in 107 of FIGS. 27 and 28, but also intended to accommodate a bus run entering from the rear. The lower terminals of this configuration are intended to receive external cabling 103, entering from below the support structure, and therefore intermediate member 91 is oriented as previously shown in FIGS. 23 and 24.

Referring to FIGS. 31 and 32, the lower terminals are intended to receive cabling 103, as shown in above FIGS. 29 and 30, and therefore include intermediary connecting means 91 similarly oriented. The upper terminals are intended to connect to a bus run entering from above the support structure. Hence, another form of intermediary bus connectors 115 are employed, which are directly secured to the support structure connecting means by bolts 117.

Referring to FIGS. 33 and 34, both the upper and lower terminals are intended to be connected to bus runs, in the manner shown previously for the upper terminal of FIGS. 27 and 28, and hence both of these terminals include bus conductor connecting members 107, directly bolted to portion 87 of the connecting means by bolt member 109.

FIGS. 35 and 36 show an arrangement where both the upper and lower terminals are intended to be connected to bus means, utilizing the connectors 111, previously shown for the FIGS. 29 and 30 embodiments, and directly bolted to connecting portion 87 of the connecting means by bolt members 113.

FIGS. 37 and 38 show a condition, wherein both the upper and line terminals are intended to be connected to bus runs entering from above and below the enclosure respectively. Accordingly, connectors 115, as previously shown in FIGS. 31 and 32, are provided at both ends of the support structure, and are bolted to portion 87 of the connecting means by bolt member 117.

FIGS. 39 and 40 show still another intermediary bus connecting member 121, at both the upper and lower terminals, which is secured to electrical connecting means by bolt members 123.

It should be understood that FIGS. 21–40 represent typical external circuit connections, which may be employed in conjunction with our mounting assembly, and are by no means intended to be all-inclusive.

Although there have been described preferred embodiments this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows.

1. In combination with an electrical switching device, including an enclosed switch housing having externally accessible first and second switch terminal means at longitudinally opposed first and second housing ends;

said switch terminal means including first aperture means for receiving a bolt;

a support structure for rigidly mounting said electrical switching device, and electrically connecting said switch terminal means to external circuitry;

said support structure including first and second mounting members secured thereto, and located adjacent the rear surface of said switch housing;

said first mounting member longitudinally extending from adjacent said first housing end towards the longitudinally central housing portion;

said second mounting member longitudinally extending from adjacent said second housing end towards the longitudinally central housing portion;

said first and second mounting members including first and second insulative means, respectively;

first and second conducting means carried by said first and second insulative means, respectively;

each of said conducting means including a first portion, longitudinally coextensive and rearwardly adjacent the respective switch terminal means;

said first portions including a second aperture means in alignment with said first aperture means, for receiving connecting bolt means;

each of said conducting means including a longitudinally inward second portion rearwardly adjacent the switch housing, with said switch housing forwardly overlying said second portions;

said second portions including electrical connecting means for receiving the external circuitry and electrically connecting same to said switch terminal means;

said connecting bolt means providing removable electrical and mechanical securement of said switching device to said support structure without disturbing the external circuitry connections;

said first and second mounting members, when secured to said support structure, having an overall longitudinal extent substantially corresponding to the longitudinal extent of said switch housing.

2. The combination, as set forth in claim 1:

said electrical connecting means including bolt receiving third aperture means;

second connecting bolt means extending through said third aperture means and cooperating aperture means of the external circuitry connection for bolting same to said conducting means second portion.

3. The combination as set forth in claim 2:

said external circuitry connection including an intermediary connecting means;

said intermediary connecting means including fourth aperture means positionable in alignment with said third aperture means, and receiving said second connecting bolt means for bolting said intermediary connecting means to said conducting means second portion;

said intermediary connecting means including a connection means for directly receiving external circuit connections.

4. The combination as set forth in claim 3:

said connection means being fifth aperture means for receiving a cable and firmly anchoring same;

said fourth aperture means capable of positioning said intermediary connecting means, such that the axis of said fifth aperture means is perpendicular to said longitudinal direction, and extends rearward of said switch housing, such that external cabling approaching said support structure from the rear is directly routed to said fifth aperture means in a substantially straight line path along the direction of said fifth aperture means axis.

5. The combination as set forth in claim 3:

said connection means being fifth aperture means for receiving a cable and firmly anchoring same;

said fourth aperture means including a plurality of apertures in each of said intermediary connecting means for selectively positioning said intermediary connecting means in at least a first and second orientation;

said first orientation positioning said intermediary connecting means such that the axis of said fifth aperture means thereof is perpendicular to said longitudinal direction, and extends rearward of said switch housing, such that external cabling approaching said support structure from the rear is directly routed to said fifth aperture means in substantially straight line paths along the direction of said fifth aperture means axis.

6. The combination as set forth in claim 5:

said second orientation positioning said intermediary connecting means, such that the axis of said fifth aperture means thereof is parallel to said longitudinal direction and extends rearward of said switch housing, such that external cabling approaching from longitudinally beyond said support structure is directly routed to said fifth aperture means in a substantially straight line path along said longitudinal direction and rearward of said switch housing.

7. In a combination, as set forth in claim 1:

said electrical switching device being a circuit breaker of at least three phases;

each of said first switch terminal means including first, second and third, transversely adjacent and electrically insulated, individual phase line terminals;

each of said second switch terminal means including first, second and third transversely adjacent and electrically insulated individual phase load terminals;

each of said conducting means including individual first, second and third phase conductors;

said insulative means including insulative material for electrically insulating the transversely adjacent individual phase conductors of the same conducting means, and the longitudinally proximate individual phase conductors of said first and second conducting means.

References Cited

UNITED STATES PATENTS

| | | | |
|---|---|---|---|
| 3,334,277 | 8/1967 | Strobel | 317—119 |
| 3,366,844 | 1/1968 | Chamberlin | 317—118 X |
| 3,366,846 | 1/1968 | Brumfield | 317—119 |

LEWIS H. MYERS, Primary Examiner

G. P. TOLIN, Assistant Examiner

U.S. Cl. X.R.

317—99